Jan. 16, 1962 M. L. PERSINGER ET AL 3,016,816
OUTDOOR BARBECUE WITH SLANTING GRILL
Filed Nov. 2, 1956 2 Sheets-Sheet 2
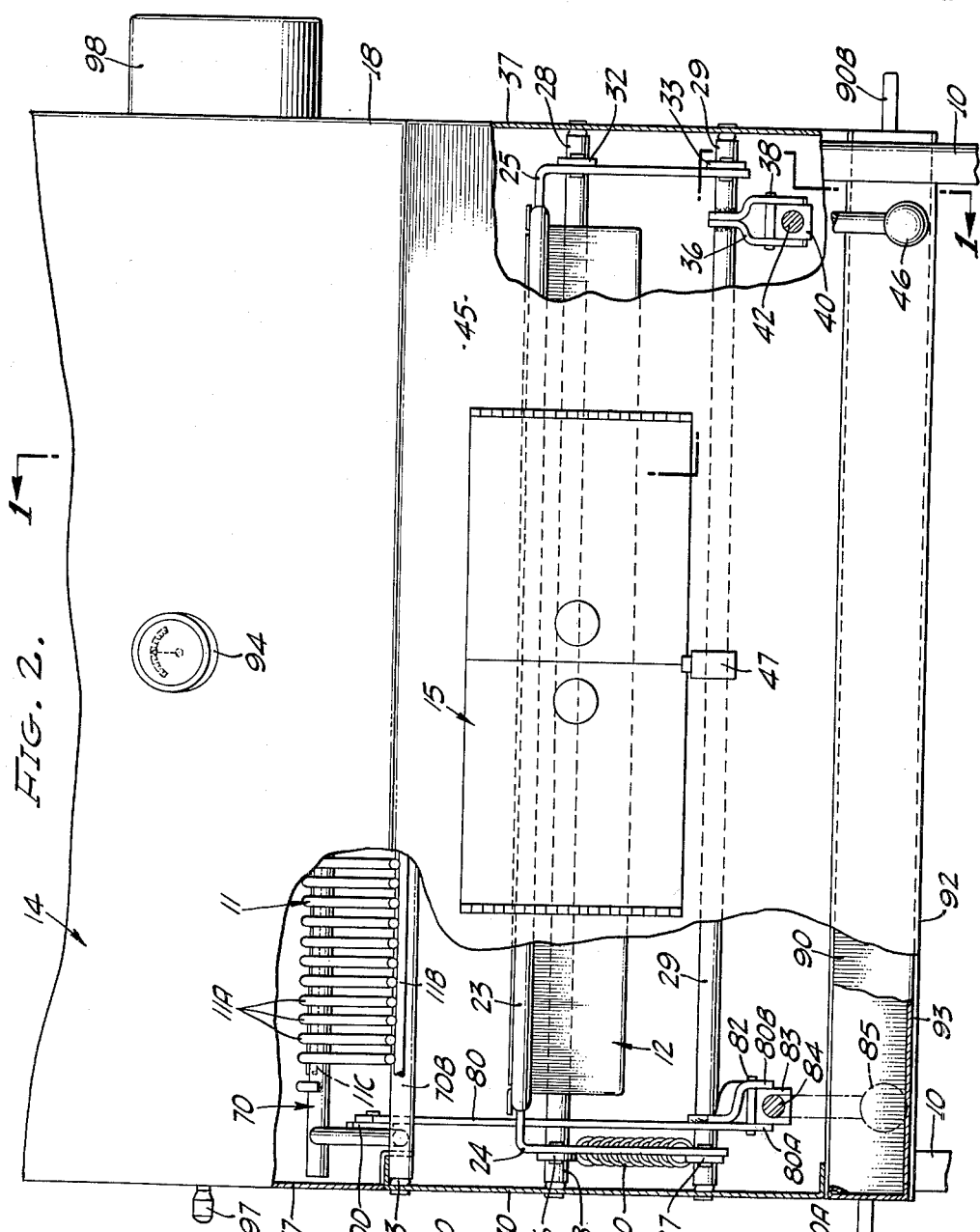
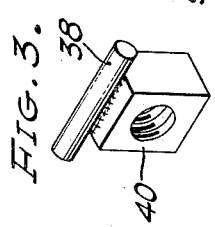
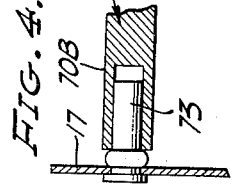
INVENTORS
MERLE L. PERSINGER
LAVERNE O. PERSINGER
BY
ATTORNEYS

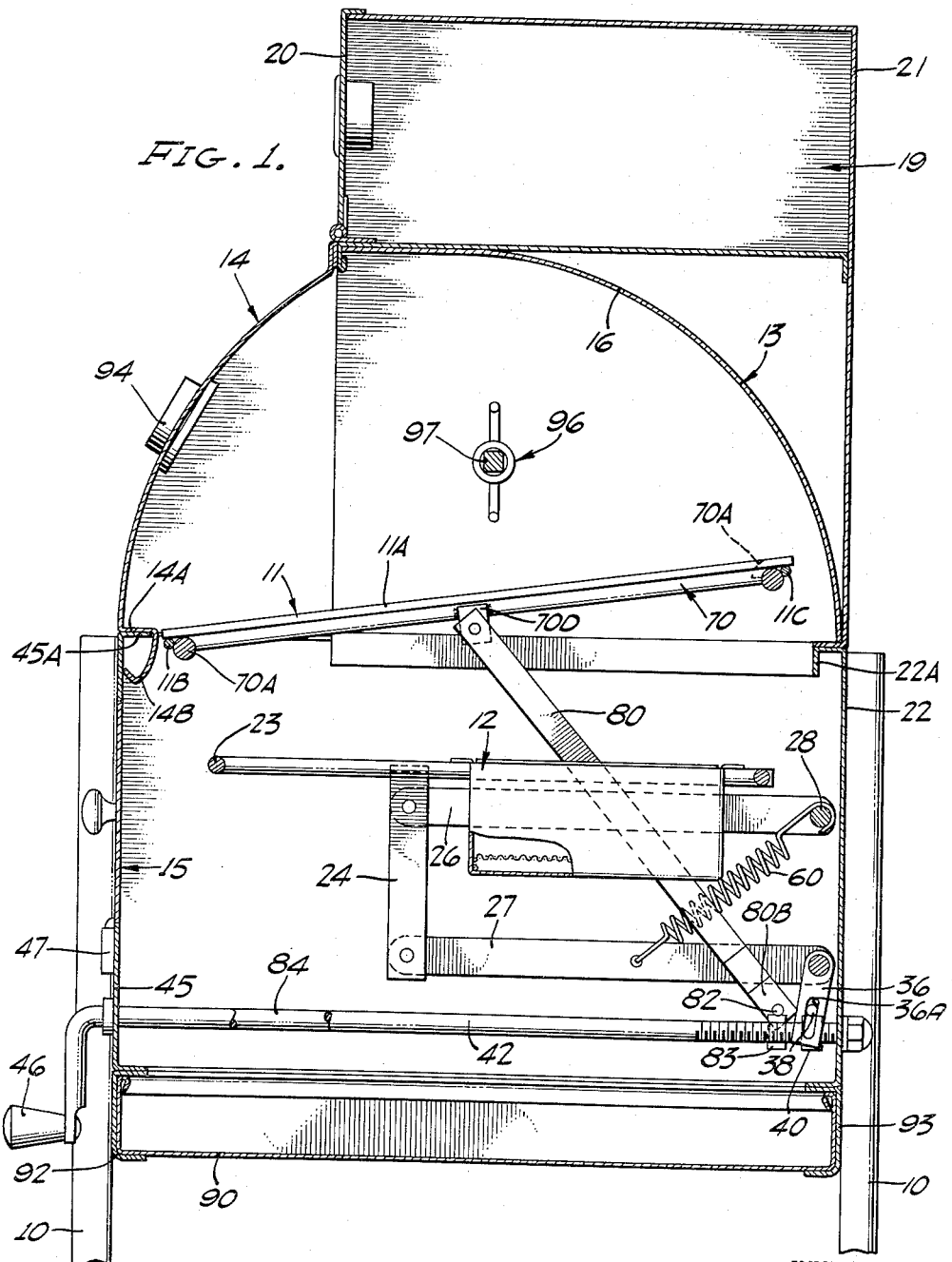

3,016,816
OUTDOOR BARBECUE WITH SLANTING GRILL
Merle L. Persinger and Laverne O. Persinger, Burbank, Calif., assignors to Seidelhuber Steel Rolling Mill Corporation, a corporation of Washington
Filed Nov. 2, 1956, Ser. No. 620,020
2 Claims. (Cl. 99—339)

The present invention relates to barbecue equipment, and more specifically to barbecue equipment for outdoor use.

An object of the present invention is to provide improved barbecue equipment for outdoor use.

Another object of the present invention is to provide barbecue equipment for outdoor use having a manually adjustable grill which may be adjusted to different tilted positions.

Another object of the present invention is to provide improved barbecue equipment for outdoor use, which incorporates an adjustable slanting grill down which greases fall and drip therefrom into a grease pan without going into the fire box.

Another object of the present invention is to provide outdoor barbecue equipment in which the grill and fire box are independently adjustable one with respect to the other.

Another object of the present invention is to provide improved barbecue equipment which is compact and relatively inexpensive, considering the adjustable features thereof.

Another object of the present invention is to provide improved barbecue equipment of this character having a novel type of door for closing the cooking space.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a sectional view taken generally on the line 1—1 in FIGURE 2.

FIGURE 2 is a view in front elevation showing a portion of the barbecue illustrated in FIGURE 1, with parts broken away to disclose internal construction.

FIGURE 3 is a perspective view of one of the elements used in tilting the grill.

FIGURE 4 is a sectional view illustrating the manner in which the grill is pivoted.

The barbecue equipment is supported on four legs 10, and includes an adjustable grill and an adjustable fire box 12.

The grill 11 and fire box 12 are enclosed in a sheet metal housing or casing 13 having an upper removable door 14 and a two-section lower hinged door 15.

The lower portion of the housing 13 is generally rectangular and defines the fire box 12, while the upper portion of the housing 13 defines generally the cooking space and is defined by the rear curved wall 16 and a curved door 14, as well as the two parallel extending side walls 17, 18 of the casing 13.

A warming oven 19 of generally rectangular shape and having a front hinged door 20 is disposed above the rear curved wall 16 and is also of sheet metal. It is noted that the rear wall 21 of the cooking oven 19 extends downwardly and has its lower end bent inwardly between the lower end of curved walls 13 and the upper flanged portion 22A of the wall 22 that defines the fire box chamber. All the sheet metal elements are suitably secured together using conventional means.

The fire box 12 is essentially a rectangular pan having an upward outwardly extending peripheral flange which rests on an adjustable open rectangular carriage 23. This carriage 23 is adjustable in height so as to control the spacing between the fire box 12 and the grill 11. For this purpose, the carriage 23 is supported on a pair of links 24, 25. The link 24 has a pair of parallel extending arms 26, 27 pivoted thereon, the other ends of the arms 26, 27 being secured to the rods 28 and 29 which extend through and are rotatably mounted on the side walls 30, 31 of the fire box chamber. In similar manner the link 25 has pivoted thereto a pair of parallel extending levers 32, 33 also having their inner ends secured on the aforesaid rods 28, 29 so as to provide a parallelogram type of support. The rod 29 has a crank arm 36 secured thereto and such arm comprises a pair of spaced plates each having a cam slot 36A therein, through which a pin 38 passes. The pin 38 as shown in FIGURE 3, is welded to a nut 40 threaded on the extended crank arm 42.

The crank arm 42 extends through and is rotatably mounted in the front and rear walls 45, 22 of the fire box chamber. Thus, upon rotation of the crank handle 46, the nut 40 moves longitudinally on the threaded crankarm 42 to pivot the arm 36 and thus raise or lower, as desired, the fire box 12.

A counterbalance spring 60 has one of its ends hooked around the rod 28, and the other one of its ends attached to an intermediate lever 27 to facilitate the raising and lowering of the fire box 12.

Access to the fire box 12 is had by opening the door 15, which is normally held closed by the latch 47.

The grill 11 comprises a series of parallel rods 11A, which are interconnected at their ends by transversely extended rods 11B and 11C. The grill 11 is releasably secured on the open rectangular carriage 70 with the rods 11B and 11C overlying the carriage so as to retain the grill in place; and, additionally, the carriage 70 has welded thereto a short rod 70A (FIGURE 1) in the nature of a hook for engaging the grill to assure retention of the grill on the carriage when and as the carriage is adjustably tilted.

The carriage 70 and grill 11 carried thereon, may be adjusted from a horizontal position to different degrees of tilt using a mechanism presently described.

The carriage 70 is pivotally mounted at its forward end on the end walls 17 and 18 using a construction illustrated in FIGURE 4, wherein the grill rod 70B has a "riv nut" 73 extending in the bore itself. The riv nut 73 is secured to the wall 17 and the rod 70B is pivoted on such riv nut 73. The carriage 70 has secured thereto a small plate 70D which is pivotally secured to the upper end of the actuating rod 80, the lower end of the rod 80 is defined by two spaced plates 80A, 80B through which a pin 82 extends. The pin 82 is welded on the nut 83 which is threaded on the crank member 84. This crank member 84 is substantially identical with the crank member 42 and is rotatably moved in the same manner and carries the crank handle 85 for rotating the threaded crank rod 84. Thus, upon rotation of the crank 85, the nut 83 moves longitudinally along the threaded rod 84 to move the lower end of rod 80 and thus pivot the carriage 70 about the axis of the carriage rod 70A.

This latter adjustment thus allows the grill 11 to be tilted to different angular positions with the axis of the grill rods 11A extended downwardly and forward for essentially two purposes, namely: to allow different portions of the grill to be spaced different distances from the fire box, and more important, to allow drippings to gravitate downwardly away from the fire box to a point where such drippings ultimately drip into the grease pan 90 without entering the fire box.

It is noted that the grease or drip pan 90 is disposed below the fire box 12 and is provided with a pair of handles 90A, 90B to facilitate sliding of the grease pan 90 in the lower portion of the housing. It is noted that the drip pan serves as a closure member for the bottom of the casing and that such drip pan 90 may be adjusted by sliding it in the casing to adjust the draft. For this purpose the drip pan 90 is slidable in the generally U-shaped sheet steel runners 92—93 secured to the lower end of the housing.

The door 14 having the temperature indicator 94 mounted thereon, is normally maintained in a closed position by gravity forces acting thereon but may be conventionally removed and placed in position, as desired. For this purpose, the door 14 is of sheet metal and bowed with its upper edge engaging a downwardly extending portion of a wall defining the warming oven, the lower end of the door 14 being formed generally as a hook to engage an inwardly extended flanged portion of the front wall 45.

More specifically, the lower end of door 14 is provided with an inwardly extended portion 14A for engaging the flanged portion 45A and a slightly curved hooked portion 14B which is engageable with the end side of the portion 45A to retain the door 14 in open position. Also, the door 14 may be completely removed by disengaging the hooked portion 14B from the flanged portion 45A.

The equipment incorporates also a motor driven spit 96 of conventional construction having a rod 97 rotatably supported in the wall 17 and driven by a motor 98 mounted on the opposite wall 18. When using the spit a smaller fire box 12 may be used so that drippings from the spit do not fall into the fire box but into the drip pan 90.

When using the grill or spit, the entire unit may be enclosed by mounting the removable door or cover 14 in the position shown in FIGURE 1 and by positioning the drip pan 90 so that it completely closes the lower end of the housing. Other adjustments may be made; for example, the door or cover 14 may be removed or retained in open position and the draft may be regulated by positioning the drip pan 90. Also, the fire box 12 may be raised or lowered, as desired, with respect to the food which is being cooked, by turning the handle 46. When the spit is being used the grill may be removed. When food is being cooked on the grill, its position with respect to the fire box may be controlled, in height and in angle, by turning the handle 85. In the latter case, the user may position the food on the grill so that it is farther away from or closer to the fire box, as desired; and by tilting the grill, the drippings run down the inclined grill rods 11A to a point from where they may fall into the drip pan 90 without entering the fire box.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:
1. Barbecue equipment comprising, in combination, an adjustable open grill which is essentially planar, means for adjusting the angle of tilt of said grill, a fire box under said grill, separate means independently of the last mentioned means for adjusting the distance between the grill and fire box, and an arcuate cover overlying at least a portion of said grill, the lower edge of the grill, when tilted, being disposed outside of the vertical projection of the firebox so that drippings from said lower edge do not fall into said firebox.

2. Barbecue equipment comprising, in combination, a casing having an opening, a tiltable open grill, means for tilting said grill about an axis adjacent said opening, a firebox under the grill, a drip pan under said firebox and slidably mounted on said casing, said grill having its lower edge disposed outside of the the vertical projection of said firebox and being tiltable to allow drippings to gravitate therefrom into the drip pan without entering said firebox, said drip pan normally closing a bottom portion of said casing and serving as a closure member to regulate the draft past said firebox, said casing including an arcuate back plate which overlies a portion of the grill for reflecting heat from the firebox onto the top of foodstuffs on said grill, said arcuate back plate overlying the rear portion of said grill, a curved cover in said opening overlying the front portion of said grill, said cover being attachably and detachably secured to said casing, and a warming oven mounted above said curved wall and said casing.

References Cited in the file of this patent
UNITED STATES PATENTS

| | | |
|---|---|---|
| Re. 21,508 | Leonard | July 16, 1940 |
| 1,010,169 | Noreck | Nov. 28, 1911 |
| 2,114,697 | Babin | Apr. 19, 1938 |
| 2,114,698 | Babin | Apr. 19, 1938 |
| 2,253,834 | Volks | Aug. 26, 1941 |
| 2,309,784 | Peron | Feb. 2, 1943 |
| 2,478,253 | Doner | Aug. 9, 1949 |
| 2,608,190 | Winning et al. | Aug. 26, 1952 |
| 2,626,559 | Rau | Jan. 27, 1953 |
| 2,720,827 | Del Francia | Oct. 18, 1955 |
| 2,763,200 | Kittler | Sept. 18, 1956 |
| 2,838,991 | Kleinmann | June 17, 1958 |
| 2,881,695 | Di Pietro | Apr. 14, 1959 |

FOREIGN PATENTS

| | | |
|---|---|---|
| 75,616 | Germany | Oct. 1, 1893 |
| 14,030 | Great Britain | Nov. 16, 1895 |